United States Patent [19]

Carter

[11] Patent Number: 5,342,029
[45] Date of Patent: Aug. 30, 1994

[54] SUSPENSION STRUT UPPER MOUNT

[75] Inventor: Robert L. Carter, Gibraltar, Mich.

[73] Assignee: Chrysler Corporation, Highland Park, Mich.

[21] Appl. No.: 129,479

[22] Filed: Sep. 30, 1993

[51] Int. Cl.$^5$ ............................................. B60G 15/00
[52] U.S. Cl. ...................... 267/220; 267/33; 188/321.11
[58] Field of Search .................. 267/33, 35, 220, 219, 267/225, 292, 293, 294, 153, 141, 141.2; 188/321.11; 280/668

[56] References Cited

U.S. PATENT DOCUMENTS

| | | | |
|---|---|---|---|
| 4,249,645 | 2/1981 | Level et al. | 267/220 X |
| 4,274,655 | 6/1981 | Lederman | 280/688 |
| 4,465,296 | 8/1984 | Shiratori et al. | 280/668 |
| 4,477,061 | 10/1984 | Kawaura et al. | 267/33 X |
| 4,478,396 | 10/1984 | Kawara et al. | 267/220 X |
| 4,486,028 | 12/1984 | Tanahashi | 267/220 X |
| 4,747,587 | 5/1988 | Ferrel | 267/220 |
| 4,798,370 | 1/1989 | Inuzuka | 267/220 |
| 4,909,642 | 3/1990 | Hoermandinger | 280/668 X |
| 4,934,730 | 6/1990 | Okuzumi | 280/668 |
| 5,040,775 | 8/1991 | Miyakawa | 267/220 |
| 5,078,370 | 1/1992 | McClellan | 267/220 |
| 5,176,369 | 1/1993 | Ito | 267/220 X |

FOREIGN PATENT DOCUMENTS

| | | | |
|---|---|---|---|
| 3812477 | 10/1988 | Fed. Rep. of Germany | 267/220 |
| 0182503 | 11/1982 | Japan | 280/668 |

Primary Examiner—Mark T. Le
Assistant Examiner—Peter M. Poon
Attorney, Agent, or Firm—Edward P. Barthel

[57] ABSTRACT

An automotive suspension strut upper mounting arrangement providing increased stroke length and enhanced tunability by virtue of the major working area of the mount being located above the tower attachment surface. The mounting assembly comprises an outer housing defined by an upper closure formed with a flanged brim and a lower closure formed with a terminal flange. The housing encloses a composite mount comprising an elastomeric isolator ring surrounding an inner metal cup with the cup upstanding side wall embedded in the ring. The ring has an upper end face which abuts an upper closure internal shoulder and a lower tubular extension sized for press-fit capture in a lower closure annular U-shaped channel. Upon the upper closure flanged brim and the lower closure terminal flange being secured in flatwise contact an axial pre-load is applied to the elastomeric ring.

6 Claims, 2 Drawing Sheets

SUSPENSION STRUT UPPER MOUNT

BACKGROUND OF THE INVENTION

This invention relates to automotive suspensions and, more particularly, to an improved upper mounting assembly for hydraulic suspension shock absorbers which is readily fabricated as a sub-assembly while requiring minimal installation time during vehicle production line assembly.

An example of one low profile suspension strut is found in U.S. Pat. No. 4,747,587 issued May 31, 1988 to Farrell and assigned to the assignee of the present application. The Farrell patent discloses a strut isolator and jounce bumper upper mount providing a compact resilient assembly adaptable for a vehicle having a reduced hood line.

The U.S. Pat. No. 5,078,370 issued Jan. 7, 1992 to McClellan is an example of a vehicle front suspension strut having integrated jounce and rebound stops. In the McCellan patent the suspension spring rebound load is placed on a lower rebound stop member of the mount and the suspension jounce load is placed on an upper jounce stop member of the mount.

The U.S. Pat. No. 4,934,730 issued June 19, 1990 to Okuzumi is an example of a vehicle front suspension strut wherein the upper end of the strut piston rod is engaged in an inner sleeve of a mount insulator for limited axial movement relative to the inner sleeve.

The U.S. Pat. No. 4,274,655 issued June 23, 1981 to Lederman discloses a resilient strut mount comprising an annular mounting plate, an elastomeric ring, a central sleeve with an attached end plate, and a ball thrust bearing. The annular mounting plate, the central sleeve and the upper bearing ring of the thrust bearing are bonded to the elastomeric ring to form a subassembly.

SUMMARY OF THE INVENTION

It is an object of the present invention to provide an improved strut resilient upper mounting assembly for a vehicle suspension wherein the major working area of the shock mount is located above the shock tower attachment surface enabling increased strut length.

It is another object of the present invention to provide an improved strut resilient upper mounting assembly for a vehicle suspension which is readily fabricated into a subassembly for ease of assembly line installation in a vehicle strut tower.

It is a further object of the present invention to provide an improved strut resilient mounting assembly for a vehicle front suspension wherein a composite elastomeric ring and metal cup unit adapted for ready press-fit capture within a housing comprising upper and lower one-piece metal closures such that upon securing a brim flange of the upper closure in flatwise contact with a terminal flange of the lower closure an axial pre-load is applied to the composite mount elastomeric ring.

These and other objects and advantages of the present invention will be readily apparent by reference to the following description of the preferred embodiment and the accompanying drawing which shows, mostly in cross section, a vehicle suspension strut incorporating the improved upper mount.

DETAILED DESCRIPTION OF THE INVENTION

Figure 1:
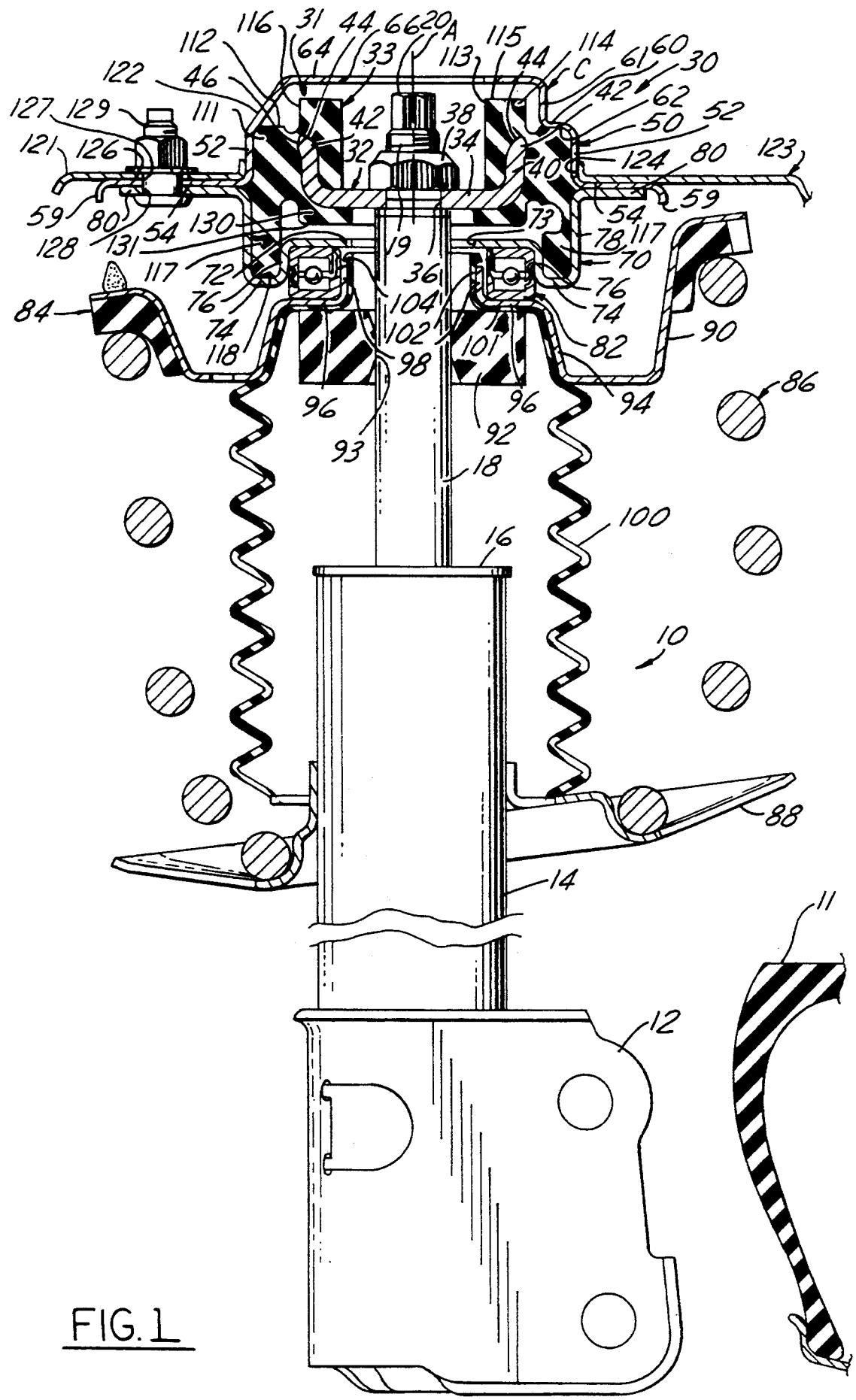
FIG. 1 is a fragmentary front view, partly in cross-section, of a suspension strut incorporating an upper mount of present invention fixedly attached in a strut tower.

Referring now to the drawing, there is shown in FIG. 1 a portion of a vehicle front suspension having a hydraulic shock absorbing damper strut 10 interconnecting the sprung mass body portion with the vehicle's unsprung mass supported by a front wheel 11. The damper strut 10 comprises a lower mounting bracket 12 connected to a steering knuckle (not shown). The mounting bracket 12 provides a lower attachment for outer cylindrical strut support tube 14. The support tube is suitably secured as by welding in the lower bracket 12 and extends upwardly therefrom. The upper end of the support tube 14 is closed by upper cap 16, welded or otherwise secured to the support tube. Reference may be had to the U.S. Pat. No. 5,078,370, mentioned above, which patent discloses details of conventional shock absorber components and is incorporated by reference herein.

A cylindrical piston rod 18 extends axially upwardly from a conventional valved piston (not shown) slidably mounted in a cylindrical inner tube (not shown) radially spaced inwardly from the support tube 14 which provides a reservoir for the strut hydraulic dampening fluid. The piston rod 18 has a reduced diameter threaded upper end 20 removably attached to a shock upper mounting assembly, generally indicated at 30, which is the subject of the present invention.

As seen in FIG. 1, the upper mount assembly 30 comprises an outer two-part housing defined by an upper closure 50 and a lower closure 70 each formed from sheet metal. The two-part closure houses a composite isolator mount, generally indicated at 31, comprising an annular inner mounting cup 32 surrounded by an elastomeric ring 33. The inner cup 32 and the ring 33 are concentrically disposed about the strut principal axis "A". The inner cup 32 comprises a closed bottom wall 34 formed with a central hole 36 having its center aligned on the shock axis so as to receive therethrough the piston rod upper end 20 for threaded attachment by nut 38. The inner cup 32 has an upstanding cylindrical side wall 40 embedded in the ring and terminating at its upper end in jounce stop means. As seen in FIG. 1, the jounce stop means is in the form of an annular bulb-shaped lip portion 42. The bulb-shaped lip portion 42 is defined in radial section by an upwardly and inwardly facing convex section beveled portion 44 and an outwardly facing convex portion 46 disposed concentrically about the strut principal axis "A".

The upper hat-shaped sheet metal closure member, generally indicated at 50, has a cylindrical upstanding outer wall portion 52 disposed concentrically around the cup side wall 40 defining an annular space therebetween. The upper closure outer wall portion 52 has its lower end formed with a radially outwardly extending support flanged brim 54. As seen in elevation FIG. 2, the flanged brim defines a generally rectangular-shaped outer periphery with three relatively small radius corners 56 and a remaining relatively large radius corner 58. It will be noted in FIG. 1 that the flanged brim 54 is bordered by a down-turned outer peripheral edge 59 providing additional stiffness to the upper closure member 50.

The upper closure member 50 is formed with an upper reduced diameter cap portion "C" defined by a radially inwardly extending step 60 and an upwardly extending riser 61 defining an internal shoulder 62. The cap portion "C" terminates in an upper horizontal annular web 64 provided with a central access aperture 66 having a diameter slightly greater than the diameter of the ring interior cylindrical surface 113.

The lower sheet metal closure member, indicated generally at 70, comprises a central circular disc 72 concentrically disposed about the strut axis "A". The disc 72 has a central opening 73 concentric with the strut axis "A" and is bordered by concentric countersunk U-sectioned annular channel defined by a radially extending bight wall 74 and interior 76 and exterior 78 channel walls. The interior axially extending channel wall 76 has a first axial extent about one-half the axial extent of the outer channel wall 78. It will also be seen that the outer channel wall 78 has an internal diameter equal to the internal diameter of the upper closure outer wall 52.

FIG. 1 depicts the outer channel wall 78 terminating at its upper end in a radially outwardly extending terminal flange 80 adapted for flatwise flush seating contact with the upper closure member flanged brim 54. Thus, the assembled upper closure member 50 and the lower closure member 70 define a two piece outer annular housing adapted to enclose the composite isolator mount 31 in a manner to be explained. The lower closure member disc 72 provides an annular downwardly facing cavity sized to snugly receive therein a circular ball bearing ring assembly 82.

An upper annular spring seat assembly 84 is resiliently supported on the upper coil of an helical suspension spring generally indicated at 86. The suspension spring 86 spirals around the strut outer support casing 14 and extends upwardly from an annular lower spring support member 88 welded or otherwise secured to the support casing 14 above the mounting bracket 12.

The upper spring seat assembly 84 comprises a sheet metal U-sectioned trough member 90 concentrically surrounding an elastomeric jounce bumper 92. The bumper has a central hole 93 receiving, in a press fitting manner, an upper portion of the piston rod 18.

An inner trough wall 94 of the upper spring seat assembly terminates at its upper end in an L-shaped annular flange providing a radially inwardly extending shelf portion 96 and an axially upstanding riser portion 98. The L-shaped flange is sized to support in a conforming manner a circular ball bearing ring assembly 82.

A dust tube 100, made of suitable elastomeric or plastic material, has its upper end formed with a right angle bend defining a radial inward extending portion 101 and an upright cylindrical portion 102. The upright portion has its upper end formed with a retaining detent 104 which snap-fits over the upper edge of the riser portion 98.

The ring 33, molded of suitable deformable elastomeric material such as natural or synthetic rubber, has an annular body 111 in which the cup 32 side wall 40 is embedded together with a radial outer portion of the cup bottom wall 34. The ring 33 has a predetermined outer diameter which is received in a radial press-fit manner within the upper closure member cylindrical outer wall 52. It will be noted that the ring body 111 has an upper radially outer periphery defining an upper annular end face 112 adapted to seat against the internal upper closure internal shoulder 62. It will also be seen that the cup side wall upper jounce stop lip portion 42 is spaced radially inwardly from the upper closure member outer wall 52 so as to underlie, in axially spaced relation, the cap annular web 64.

FIG. 1 shows the ring body 111 formed with a central axially extending concentrically disposed cavity having a predetermined diameter substantially equal to the cap web access opening 66. The ring body 111 has an upper radially inner periphery defining an annular upstanding jounce collar 114 having an upper annular free end 115 spaced a predetermined axial dimension above the ring top end 112 and from the underside of the cap web 64. Thus, the jounce collar upper end 115 is adapted for flush resilient contact with the undersurface of the cap web 64 upon the shock piston rod 18 undergoing a predetermined upward jounce stroke. The jounce collar 114 has a predetermined radial dimension about one-half the radial dimension of the ring body 111. It will be appreciated that the composite mount 30 is adapted to be tuned by varying either or both the axial dimension between the jounce collar upper free end 115 and the cap web 64 together with the collar radial dimension or height.

The ring body 111 is integrally formed with an axially depending tubular extension 117 having a predetermined radial thickness substantially conforming to the radial extent of the ring upper end face 112. The tubular extension 117 is configured and sized for press-fit insertion in the lower closure U-sectioned channel such that its lower free end 118 seats on the internal surface of the channel bight wall 74. It will be noted that the tubular extension 117 has a predetermined outer diameter equal to the outer diameter of the ring body 111.

The composite mount external axial dimension between the ring upper end face 112 and tubular extension lower free end 118 exceeds by a predetermined differential the housing internal axial dimension between the internal shoulder 62 and the internal surface of the channel bight wall 74. The strut upper mount assembly 30 is assembled by inserting the composite mount 31 in a press-fit manner in the upper closure so as to seat the ring upper top end 112 in contact with the internal shoulder 62. Next, the lower closure member channel is press-fitted on tubular extension 117 such that its lower free end 118 seats on the channel bight wall 74 internal surface. Thereafter, the upper closure member flanged brim 54 is fixedly attached on the lower closure member terminal flange 80 whereby the ring 31 is compressed within the two-piece housing imparting an axial pre-load thereto. It is thus possible to readily vary the above mentioned composite mount axial pre-load thereby axially tuning the upper mount assembly.

In the disclosed form the inner cup 32 is shown having a circular section in plan. It will be appreciated, however, that the inner cup may be formed with an elliptical section wherein the isolator ring 31 pre-compression and shear areas vary. Such an elliptical shape allows both longitudinal and transverse tuning of the suspension mount.

Figure 2:
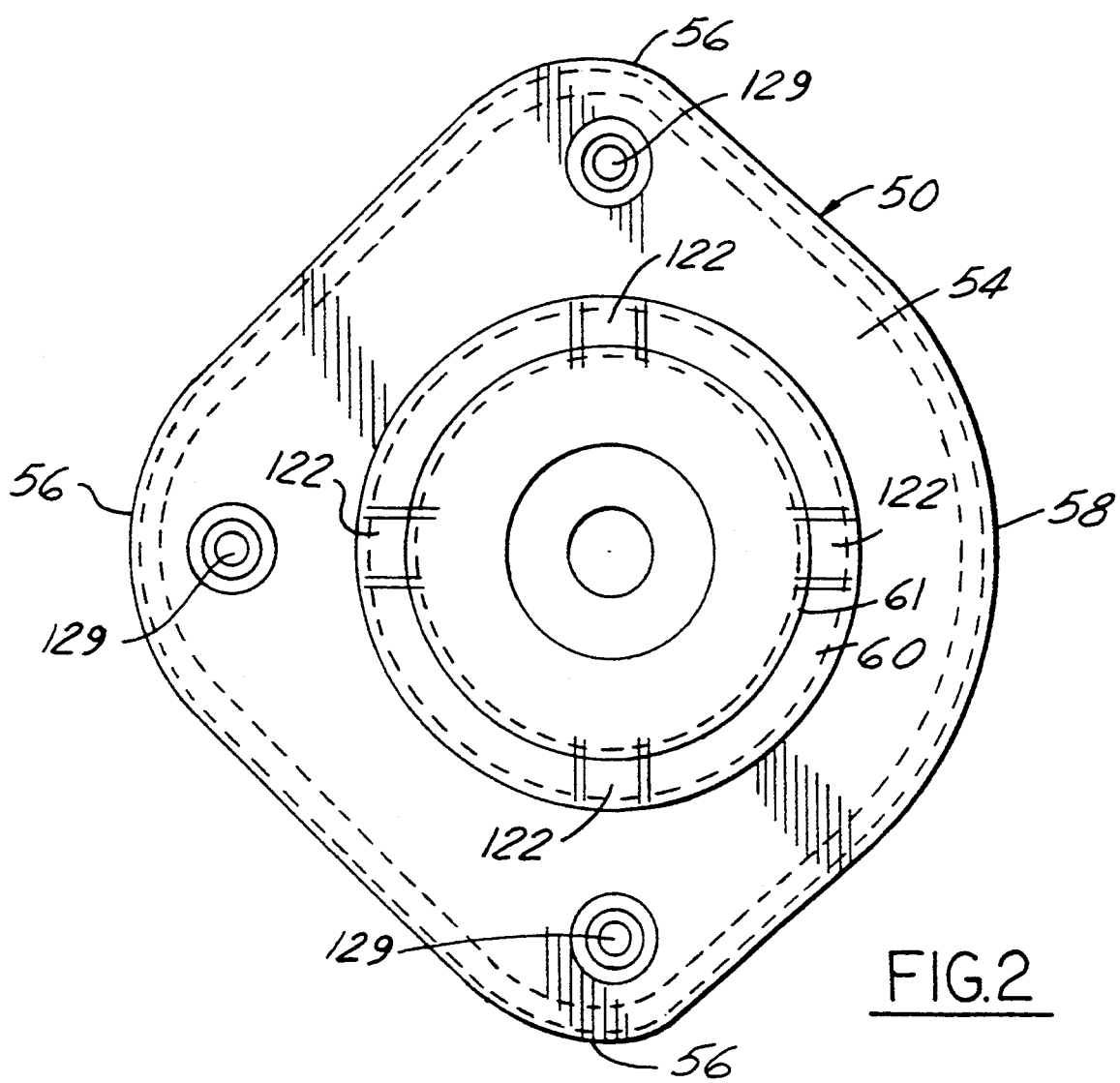
FIG. 2 is a detail top view of the strut upper mount of FIG. 1 prior to attachment to a strut tower.

As seen in FIG. 2, the upper closure stepped shoulder 60 and riser 61 are provided with a plurality of integrally formed downwardly and outwardly sloped ramp portions 122 shown uniformly spaced around the periphery of the upper cap portion "C". The bridging ramps 122 define a frusto-conical lead-in envelope providing ready blind insertion through a body substructure sheet metal flanged opening. In the disclosed form, the mount attaching flanged brim 54 is adapted to be removably fixed to a structural sheet metal panel 121 defining the upper end of a shock mounting tower portion of the vehicle sprung body partially indicated at 123. FIG. 1 shows the panel 121 having a flanged circular aperture 124 surrounded by a plurality of oversize stake screw holes, one of which is shown at 126.

It will be appreciated that upon the mount assembly upper and lower closures enclosing the composite mount 31 the lower closure terminal flange 80 is positioned in flatwise or flush contact with the upper closure brim flange 54 with each of its drilled holes 127 aligned with a matching drilled hole 128 in the terminal flange 80. Each pair of holes 127 are 128 are sized for the press-fit reception of a stake screw 129. The stake screws 129 are installed by an automatic staking operation which axially upsets the screw unthreaded length causing radially expansion thereof fixedly clamping the flanges 54 and 80. The stake screws 129 lock the upper and lower closures together obviating the higher cost and weld splatter common with weld screws. The mounting assembly 30 is completed upon driving the stake screws through their associated holes 127 and 128 wherein an axial pre-load is applied to the elastomeric ring body portion 111 by the upper and lower closures.

The isolator ring body 111 is integrally formed with lower rebound bumper means in the form of an radially inwardly extending annular rebound collar 130 bonded to the underside of the cup bottom wall 34. As seen in FIG. 1, the rebound collar 130 overlies the lower closure member central disc 72 and has its lower end 131 axially spaced a predetermined dimension from the upper surface of disc 72. Thus, the disc 72 provides a stop surface for the rebound collar 130 while the cap web 64 provides a stop surface for the jounce collar 114.

While only one embodiment of the present invention has been described, other embodiments and modifications are possible without departing from the scope of the appended claims.

What is claimed is:

1. An upper mounting assembly for a suspension telescoping shock absorber strut operatively connected between sprung and unsprung masses of a vehicle about a vertically disposed principal axis of the shock absorber, the strut provided with a piston rod adapted for reciprocal movement along the strut axis, means for connecting the mounting assembly to the vehicle sprung mass and means for connecting an upper end of the piston rod to the mounting assembly, the upper mounting assembly comprising:

a composite isolator mount having a central inner metal cup formed with a bottom wall and an upstanding side wall concentrically disposed about the principal axis whereby an elastomeric ring surrounds said side wall with said side wall embedded therein;

said ring having an upper radially outer upper periphery defining an annular end face and an upper radially inner periphery defining an annular upstanding jounce collar, said ring having a lower outer periphery formed with an integral concentrically depending tubular extension of conforming radial extent relative to said upper end face, said ring having a lower inner periphery formed with an integral radially inwardly extending rebound collar bonded to an underside of said cup bottom wall;

said cup bottom wall formed with a central hole adapted to receive therethrough the piston rod upper end for attachment to said cup bottom wall, said cup side wall having its upper end terminating in jounce stop means;

said mounting assembly further comprising an outer housing concentrically disposed about the principal axis defined by upper and lower one piece metal closures, said upper closure having a cylindrical outer wall for concentrically surrounding said ring in a radially press-fit manner, said outer wall lower end terminating in a radially outwardly extending flanged brim, said outer wall formed with an upper cap portion defined by a radially inwardly extending shoulder and an axially upwardly extending riser terminating in a radially inwardly extending cap web defining a central access aperture;

said lower closure having a circular disc concentrically disposed about said axis bordered by a U-sectioned annular channel defined by interior and exterior axially extending channel walls joined by a radially extending bight wall, said exterior channel wall of predetermined diameter equal to said upper closure outer wall, said channel exterior wall terminating at its upper end in a radially outwardly extending terminal flange, whereby upon an upper surface of said terminal flange being secured in flatwise engagement with an undersurface of said flanged brim;

said composite mount configured and sized such that upon being enclosed in said assembled housing with said ring upper end face abutting an interior portion of said upper closure internal shoulder and said ring tubular extension being sized and configured for press-fit reception in said lower closure channel with a free lower end face of said extension is in abutting contact with said bight wall;

whereby with said upper closure flange brim and said lower closure terminal flange affixed in flatwise abutment said ring is axially compressed in a preloaded manner such that said jounce and rebound collars are axially spaced a predetermined extent from an underside of said cap ring and an underside of said disc, respectively, with said piston rod in its neutral mode.

2. The strut upper mounting assembly as set forth in claim 1 wherein said cup jounce stop means in the form of an annular lip portion being bulb-shaped in radial section.

3. The strut upper mounting assembly as set forth in claim 1 wherein said upper closure member wall and said lower closure member wall have a common internal diameter.

4. The strut upper mounting assembly as set forth in claim 1 wherein cap web access aperture and said isolator central cavity having substantially equal diameters.

5. The strut upper mounting assembly as set forth in claim 1 wherein said lower closure member inner channel wall having an axial dimension about one-half the axial dimension of said outer channel wall.

6. The upper mounting assembly as set forth in claim 1 wherein said upper closure member shoulder is stepped and said shoulder and riser are provided with a plurality of integrally formed downwardly and outwardly sloped ramp portions, each said ramp portion having its upper inner terminus forming a radius juncture with an outer peripheral sector of said cap web and its lower terminus forming a radiused juncture with said upper closure outer wall, whereby said ramp portions providing lead-in guides for ready blind insertion of said upper closure member in a structural panel circular flanged aperture.

* * * * *